(12) United States Patent
Dewkett et al.

(10) Patent No.: US 7,870,395 B2
(45) Date of Patent: Jan. 11, 2011

(54) LOAD BALANCING FOR A SYSTEM OF CRYPTOGRAPHIC PROCESSORS

(75) Inventors: Thomas J. Dewkett, Staatsburg, NY (US); Camil Fayad, Poughkeepsie, NY (US); John K. Li, Woodstock, NY (US); Siegfried K. H. Sutter, Elsendorf (DE); Phil C. Yeh, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 901 days.

(21) Appl. No.: 11/551,432

(22) Filed: Oct. 20, 2006

(65) Prior Publication Data

US 2008/0098233 A1    Apr. 24, 2008

(51) Int. Cl.
*G06F 12/14* (2006.01)
*G06F 15/167* (2006.01)
*G06F 15/80* (2006.01)
*G06F 15/82* (2006.01)

(52) U.S. Cl. .................. 713/189; 713/190; 713/192; 713/193; 709/215; 712/10; 712/13; 712/17; 712/27

(58) Field of Classification Search ......... 713/189–190, 713/192–193; 709/215; 712/10, 13, 17, 712/27
See application file for complete search history.

(56) References Cited

U.S. PATENT DOCUMENTS

| | | | |
|---|---|---|---|
| 4,925,311 A * | 5/1990 | Neches et al. ............... | 718/100 |
| 5,321,752 A | 6/1994 | Iwamura et al. | |
| 5,471,592 A * | 11/1995 | Gove et al. .................. | 709/213 |
| 5,513,133 A | 4/1996 | Cressel et al. | |
| 5,666,411 A | 9/1997 | McCarty et al. | |
| 5,764,554 A | 6/1998 | Monier | |
| 5,825,878 A | 10/1998 | Takahashi et al. | |
| 6,108,524 A | 8/2000 | Hershey et al. | |
| 6,141,756 A | 10/2000 | Bright et al. | |
| 6,260,087 B1 | 7/2001 | Chang | |
| 6,360,303 B1 | 3/2002 | Wisler et al. | |
| 6,363,475 B1 * | 3/2002 | Dowling ..................... | 712/206 |
| 6,366,117 B1 | 4/2002 | Pang et al. | |

(Continued)

FOREIGN PATENT DOCUMENTS

EP     0908810 A2    6/1998

(Continued)

OTHER PUBLICATIONS

Scherger, M. et al. "Multiple Instruction Stream Control for an Associative Model of Parallel Computation", 2003.*

(Continued)

*Primary Examiner*—Michael J Simitoski
(74) *Attorney, Agent, or Firm*—Steven Chiu, Esq.; Kevin P. Radigan, Esq.; Heslin Rothenberg Farley & Mesiti P.C.

(57) ABSTRACT

In an array of groups of cryptographic processors, the processors in each group operate together but are securely connected through an external shared memory. The processors in each group include cryptographic engines capable of operating in a pipelined fashion. Instructions in the form of request blocks are supplied to the array in a balanced fashion to assure that the processors are occupied processing instructions.

11 Claims, 5 Drawing Sheets

U.S. PATENT DOCUMENTS

| | | | |
|---|---|---|---|
| 6,378,072 | B1 | 4/2002 | Collins et al. |
| 6,384,628 | B1 | 5/2002 | Lacey et al. |
| 6,578,068 | B1 | 6/2003 | Bowman-Amuah ......... 709/203 |
| 6,687,735 | B1 | 2/2004 | Logston et al. ............. 709/203 |
| 6,789,256 | B1 | 9/2004 | Kechriotis et al. |
| 6,819,133 | B1 | 11/2004 | Kliesner et al. |
| 6,996,713 | B1 | 2/2006 | Trimberger |
| 7,080,110 | B2 | 7/2006 | Chen et al. ................... 708/491 |
| 7,251,804 | B1 | 7/2007 | Trimberger |
| 2002/0078308 | A1* | 6/2002 | Altman et al. ............... 711/147 |
| 2002/0166062 | A1 | 11/2002 | Helbig, Sr. |
| 2002/0191793 | A1* | 12/2002 | Anand et al. ................ 380/255 |
| 2002/0199110 | A1 | 12/2002 | Kean |
| 2003/0086300 | A1 | 5/2003 | Noyes et al. |
| 2003/0133574 | A1 | 7/2003 | Caronni et al. |
| 2003/0163431 | A1 | 8/2003 | Ginter et al. |
| 2004/0019771 | A1 | 1/2004 | Quach |
| 2004/0054706 | A1 | 3/2004 | Kawamura |
| 2004/0123121 | A1* | 6/2004 | Paaske et al. ............... 713/189 |
| 2006/0004967 | A1* | 1/2006 | Mithal et al. ................ 711/152 |
| 2006/0059369 | A1 | 3/2006 | Fayad et al. |
| 2006/0059373 | A1 | 3/2006 | Fayad et al. ................. 713/192 |
| 2006/0107032 | A1 | 5/2006 | Paaske et al. |
| 2006/0230439 | A1 | 10/2006 | Smith et al. |

FOREIGN PATENT DOCUMENTS

| | | |
|---|---|---|
| JP | 05-068032 | 3/1993 |
| JP | 05-324277 | 12/1993 |
| JP | 09-016379 | 1/1997 |
| JP | 09-274560 | 10/1997 |
| JP | 11-143688 | 5/1999 |
| JP | 11-2822351 | 10/1999 |
| JP | 2001-051832 | 2/2001 |
| WO | 01/45318 | 6/2001 |
| WO | WO 01/90903 A1 | 11/2001 |

OTHER PUBLICATIONS

U.S. Appl. No. 11/331,918, entitled "Methods For Coordinating Access To Memory From At Least Two Cryptography Secure Processing Units," Fayad et al., filed Jan. 13, 2006.

Office Action for U.S. Appl. No. 10/841,770 (U.S. Letters Patent No. 7,080,110), dated Jul. 21, 2005.

Kornerup, Peter, "A Systolic, Linear-Array Multiplier for a class of Right-Shift Algorithms", IEEE Transactions on Computers, vol. 43, No. 8, Aug. 1994 (pp. 892-898).

Montgomery, Peter, "Modular Multiplication Without Trial Division", Mathematics of Computation, vol. 44, No. 170, Apr. 1985 (pp. 519-521).

Office Action for U.S. Appl. No. 11/331,918 (U.S. Patent Publication No. 2007/0168676), dated Apr. 9, 2009.

Office Action for U.S. Appl. No. 11/331,918 (U.S. Patent Publication No. 2007/0168676), dated Oct. 29, 2009.

Office Action for U.S. Appl. No. 10/938,774 (U.S. Patent Publication No. 2006/0059373), dated Oct. 10, 2007.

Office Action for U.S. Appl. No. 10/938,774 (U.S. Patent Publication No. 2006/0059373), dated Apr. 18, 2008.

Smith, S.W. et al., "Building a High-Performance, Programmable Secure CoProcessor", Computer Networks, Elsevier Science Publishers BV, Amsterdam, NL, Apr. 23, 1999 (pp. 831-860).

Andrews, et al., "Programming Models for Hybrid CPU.FPGA Chips", IEEE Computer Society, Jan. 2004.

Fayad, C., "Montgomery Modular Arithmatic Implementation in Crypto Engines for System on Chip (SOC) Design", Thesis submitted to SUNY at Buffalo, Dec. 2003.

"Security Requirements for Cryptographic Modules", Federal Information Processing Standards Pub., FIPS PUB 140-2, Information Technology Laboratory, National Institute of Standards and Technology, Gaithersburg, MD 20899-8900, May 25, 2001.

"Secure Hash Standard", Federal Information Processing Standards Pub., FIPS PUB 180-1, Computer System Laboratory, National Institute of Standards and Technology, Gaithersburg, MD 20899-8900, Apr. 17, 1995.

"Secure Hash Standard", Federal Information Processing Standards Pub., FIPS PUB 180-2, Computer System Laboratory, National Institute of Standards and Technology, Gaithersburg, MD 20899-8900, Aug. 1, 2002.

"IBM 4758 Model 13 Security Policy", Secure Systems and Smart Cards Group, IBM T.J. Watson Research Center, Nov. 1999.

Office Action for U.S. Appl. No. 11/331,918 (U.S. Patent Publication No. 2007/0168676 A1), dated Mar. 3, 2010.

Suh et al. "AEGIS: A single-chip secure processor", Information Security Technical Report, 2005.

* cited by examiner

LOAD BALANCING FOR A SYSTEM OF CRYPTOGRAPHIC PROCESSORS

CROSS-REFERENCE TO RELATED APPLICATIONS

This application contains subject matter which is related to the subject matter of the following documents, each of which is assigned to the same assignee as this application. Each of the below listed documents is hereby incorporated herein by reference in its entirety:

Published U.S. Patent Application US 2006/0059373 A1 titled "Integrated circuit chip for encryption and decryption using instructions supplied through a secure interface" published Mar. 16, 2006;

U.S. Pat. No. 7,080,110 titled "Hardware implementation for modular multiplication using a plurality of almost entirely identical processor elements," issued Jul. 18, 2006.

Published U.S. Patent Application No. 2007/0168676 A1, titled "Methods for coordinating access to memory from at least two cryptography secure processing units", published Jul. 19, 2007.

The above referenced published patent application and issued patent are each members of two respective families of patent documents. The specifications of these documents are similar to the specifications of the other documents in their respective families.

TECHNICAL FIELD

This invention relates in general to controlling operations in a system of processor chips, and more particularly, to a method for controlling cryptographic processing operations presented in the form of a stream of request blocks. Even more particularly, the present invention is directed to a system and method which exploits the, secure, flexible and powerful capabilities of cryptographic processing chips which incorporate an internal cryptographic engine, a microprocessor and a field programmable gate array (FPGA) all of which exist behind a secure boundary. Although somewhat redundant in terms of the acronym used, these devices are referred to herein as COACH devices (Cryptography On A Chip) or COACH chips. The present invention exploits groups of these chips to more flexibly provide cryptographic processing, for encoding, decoding, signature verification and/or for authentication. Even more particularly the present invention exploits clusters of these groups of these chips and even further exploits internal cryptographic engines which support pipelined operations. The security features of these devices are discussed in the above referenced published patent application. These feature are not compromised in the practice of the present invention.

BACKGROUND OF THE INVENTION

In the patent referenced above there is disclosed a circuit for performing multiplication modulo N, where N is preferably a large prime number. Such circuits are useful for carrying out exponentiation operations modulo N. Such mathematical operations lie at the heart of a significant number of methods for encrypting and for decrypting data. The circuits disclosed provide a powerful and flexible method for such processing using concatenated arrays of what are referred to therein as "processing elements." The similarity in structure of these processing elements is also seen to be of value in structuring a process in which operations are pipelined, thus increasing overall throughput. Accordingly, it is seen that the referenced issued patent provides a useful cryptographic engine which is used in the present invention.

It is also seen that the above referenced published patent application discloses a secure processing chip which includes: a cryptographic engine such as the one in the above-mentioned issued patent, a microprocessor, an internal memory, and a hybrid FPGA/ASIC (Application Specific Integrated Circuit) chip controller. This controller provides a secure mechanism along with internal hardwired cryptographic key structures, such as fuses, which are used in decoding instruction streams which are passed to chip internals as a method for providing secure programming and structure for the FPGA/ASIC chip controller. In their normal operation subsequent to secure programming operations, these processing chips (COACH devices) receive strings of instructions through an I/O interface in the form of request blocks which may or may not be encrypted.

These chips are useable in groups without impacting their secure nature. An array of these groups is employed in the present invention. This structure provides a more flexible system which is capable of cryptographic processing in which the length of the keys is employable as a selector of the number of COACH chips to be employed in a given encryption or decryption operation or string of operations.

SUMMARY OF THE INVENTION

The shortcomings of the prior art are overcome and additional advantages are provided through the use of a system and method for controlling cryptographic operations in a plurality of cryptographic processors. The method comprises three basic steps. The first is the provision of a plurality of instruction streams from a system memory. The second is the step of supplying these instruction streams to the processors based initially on addresses within the memory. In the third step, subsequent instruction streams are retrieved by a controller from the memory based on a dynamic partitioning of the locations within the memory.

In accordance with one embodiment of the present invention, the instruction streams are supplied to the processors in a manner which takes advantage of the fact that the cryptographic engines within the processor elements are operable in a pipelined fashion. In this manner, cryptographic operations that are preferably carried out in a serial fashion may be so processed while at the same time cryptographic operations that are preferably processed in a parallel fashion may likewise be processed in this manner. In short, the structure of the processor elements 100, either within a group or within an array of groups is such as to provide processing flexibility.

Accordingly, it is seen that it is an object of the present invention to improve the operations of cryptographic devices for encoding, decoding, signature verification and authentication.

It is also an object of the present invention to exploit the pipelined structure present in some cryptographic engines.

It is yet another object of the present invention to provide load balancing to an array of cryptographic processors to thus produce an increase in performance.

It is a further object of the present invention to make the fullest possible use of hardware present in the processing of a cryptographic processing request.

It is a still further object of the present invention to keep the processing elements as busy as possible.

Additional features and advantages are realized through the systems and methods of the present invention. Other embodiments and aspects of the invention are described in detail herein and are considered a part of the claimed invention.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

DETAILED DESCRIPTION

Figure 1:
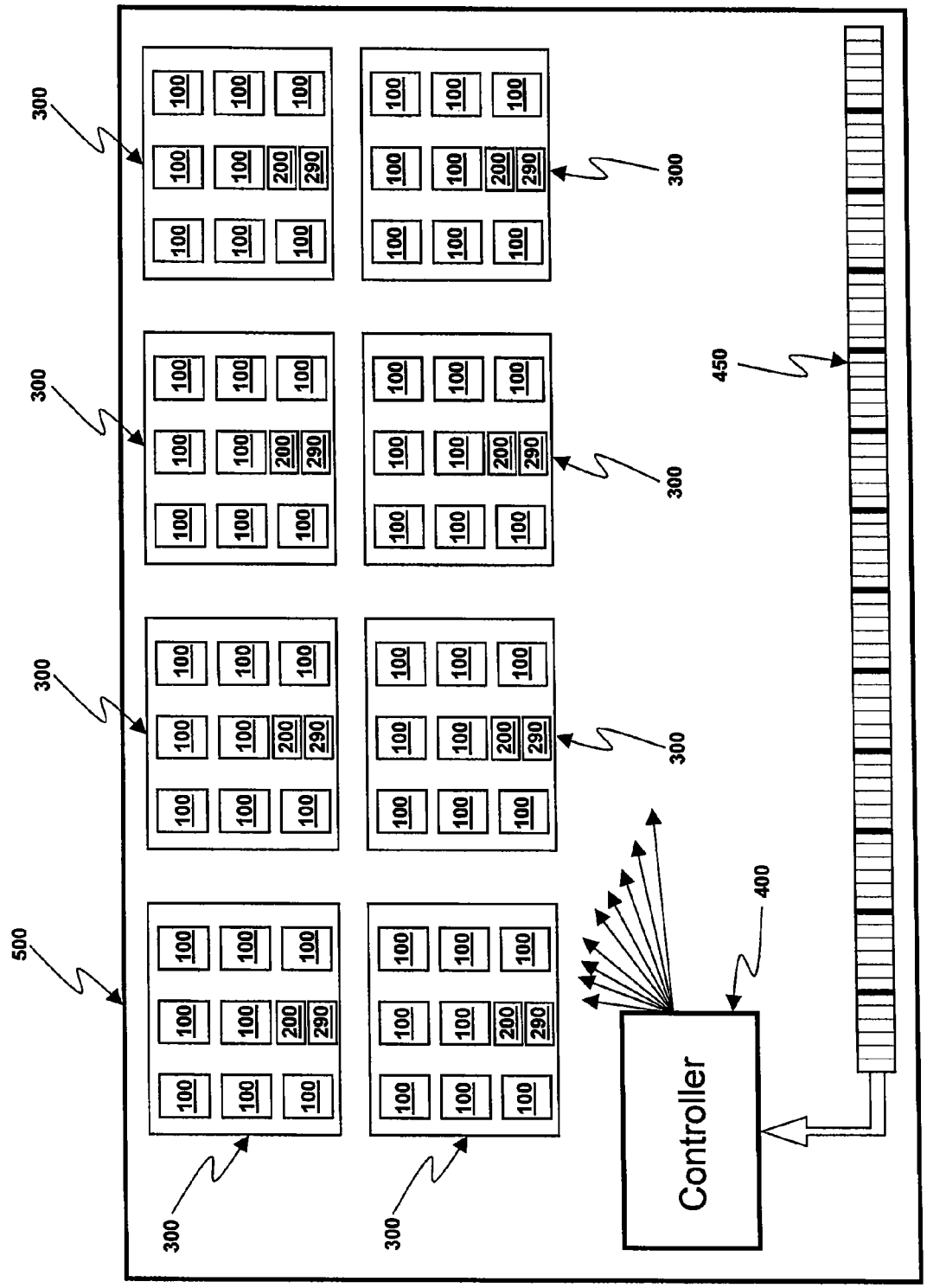
FIG. 1 is a block diagram illustrating the overall structure of the present invention and which more particularly illustrates the structure as being an array of groups of cryptographic processing devices.
Figure 2:
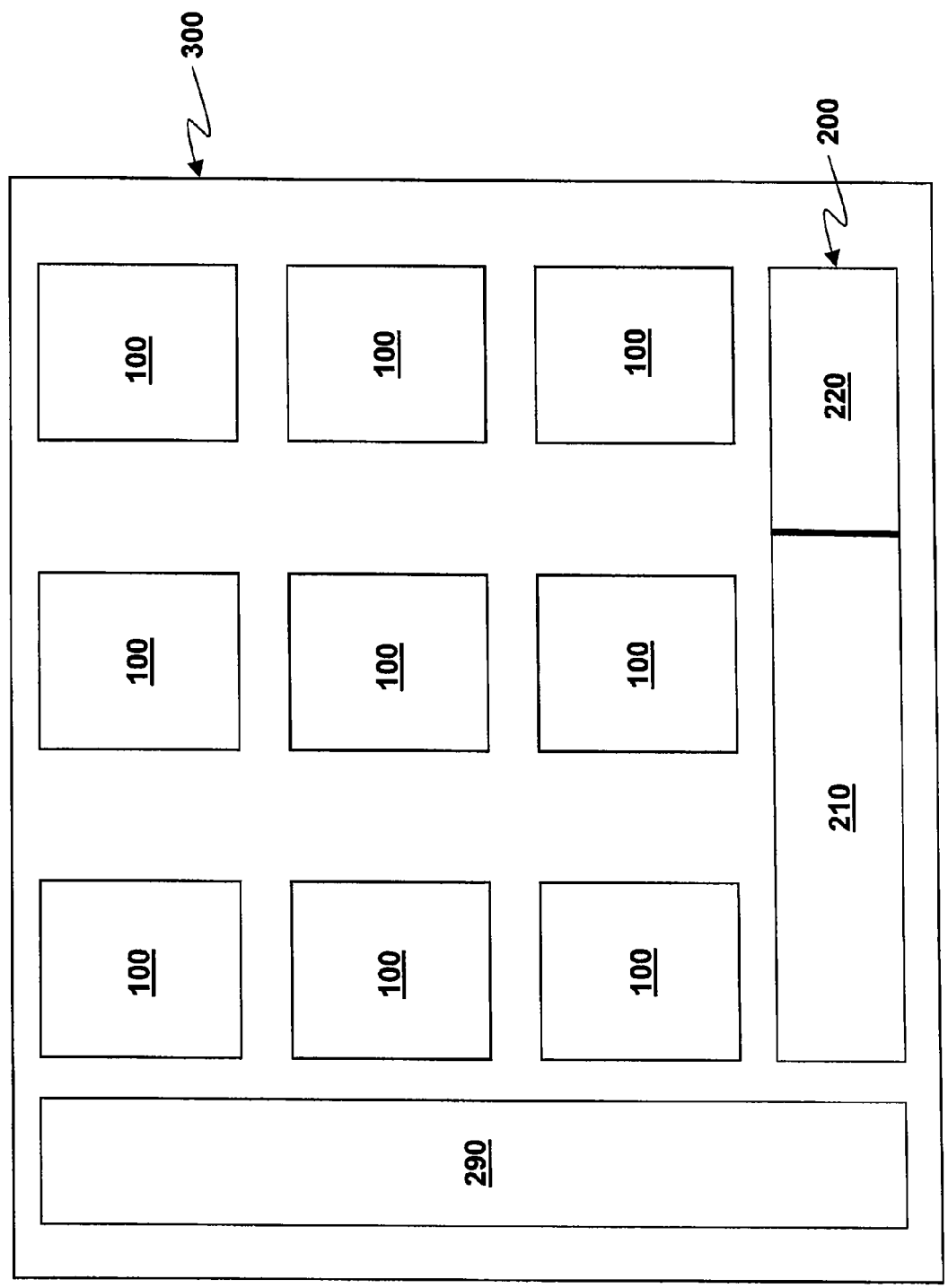
FIG. 2 is a block diagram more particularly illustrating the structure of the one of the processor groups.
Figure 3:
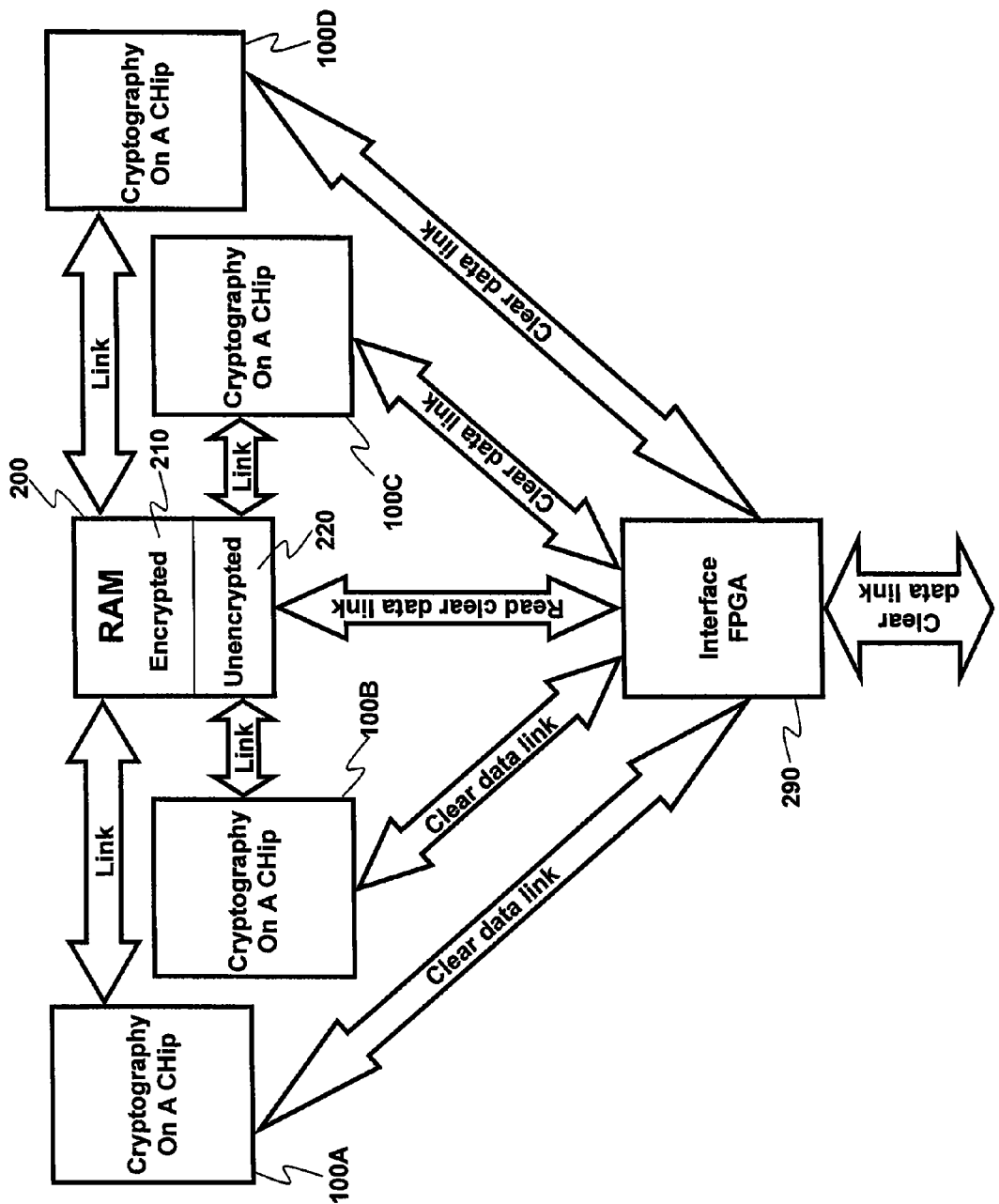
FIG. 3 is a block diagram illustrating the detailed structure and interconnections between processor elements within any given group of processors.
Figure 4:
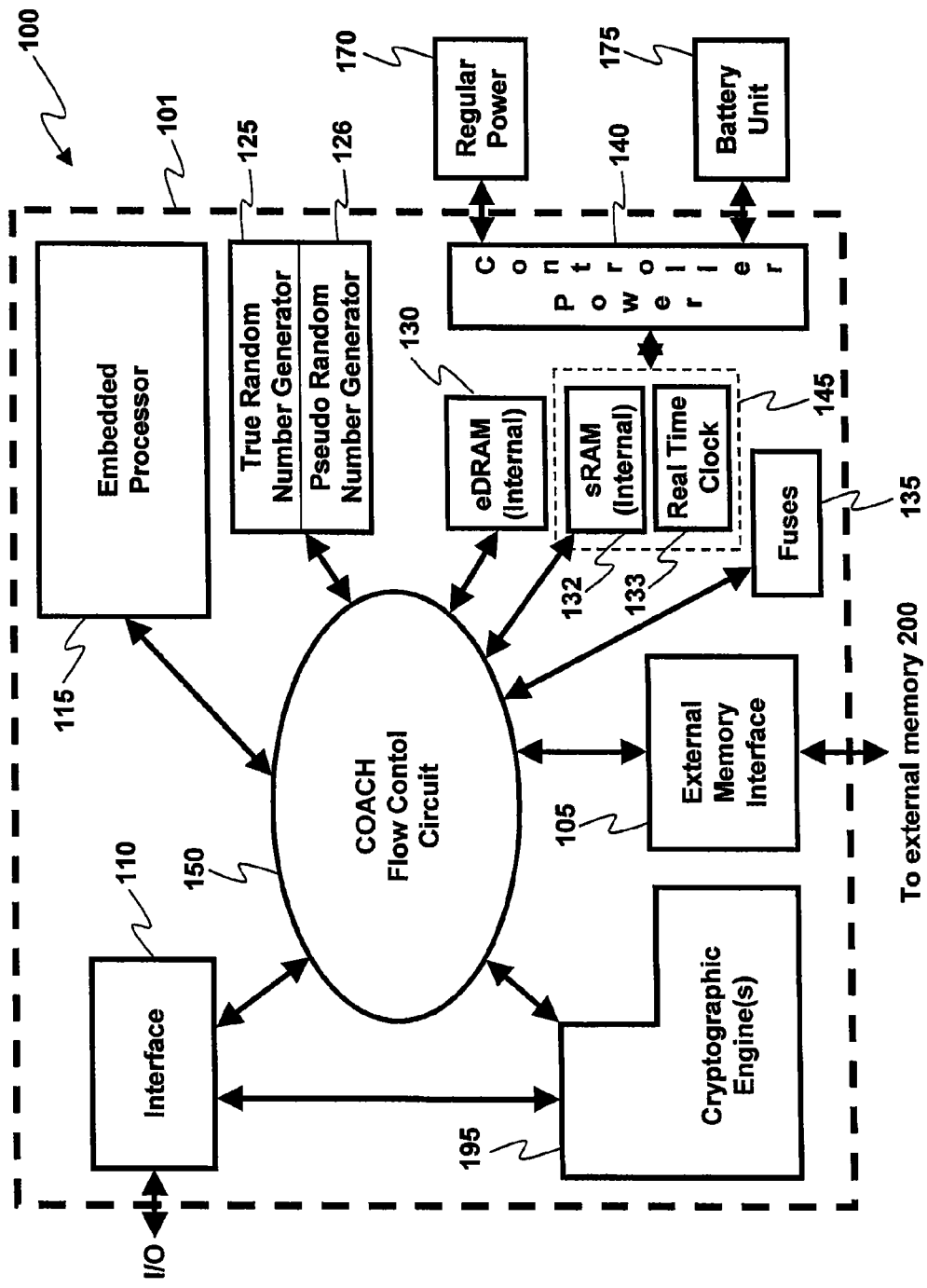
FIG. 4 is a block diagram illustrating the internal structure of one of the elements in a processor group.
Figure 5:
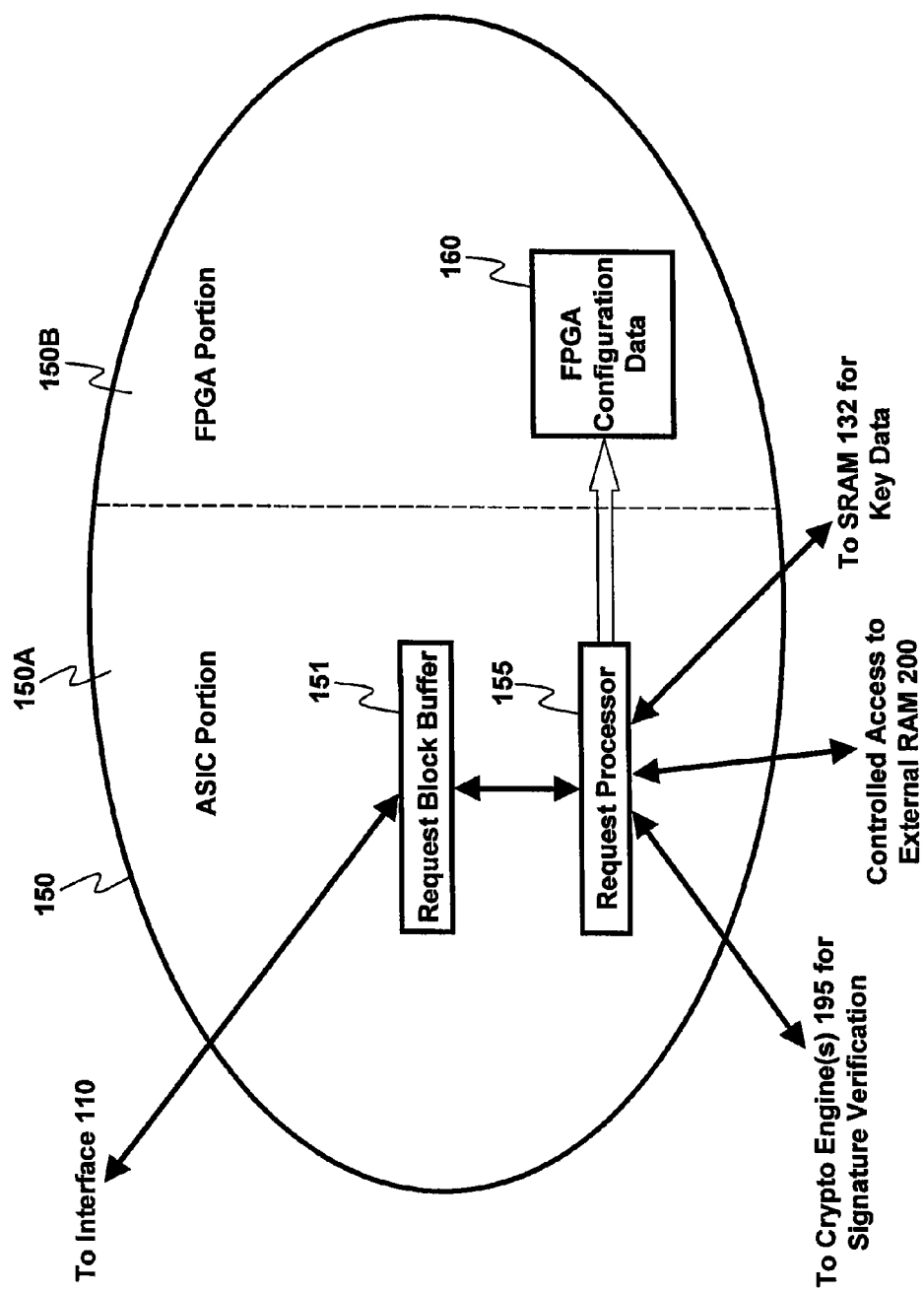
FIG. 5 is a block diagram more particularly illustrating a Field Programmable Gate Array and ASIC portion of a flow control circuit for properly securing the cryptographic processor elements.

The present invention is described herein from the outside in. FIG. 1 provides an overview of system 500 in its entirety. FIG. 2 provides a view into the next level of detail, namely that of group 300 of coordinated cryptographic processing elements 100. FIG. 3 provides a view into how individual processor elements 100 are connected so as to operate in a coordinated yet secure manner while safely but securely sharing external memory 200. FIG. 4 is a view into the internal construction of processor chip 100 (or device on a larger chip) that is usable in the practice of the present invention. FIG. 5 is a block diagram of a flow control switch used to securely coordinate the functioning of the devices present on a COACH chip.

In particular, it is noted that cryptographic engine(s) 195 exhibit a pipelined architecture such as those disclosed in U.S. Pat. No. 7,080,110. The partitioning of large arrays in the hardware structures of modulo N arithmetic circuits in cryptographic engine(s) 195, for multiplication and addition, into smaller structures results in a multiplier design comprising a series of nearly identical processing elements linked together in a chained fashion. As a result of a two-phase operation, as described in the aforementioned patent, and the chaining together of the partitioned processing elements, the overall cryptographic engine structure is operable in a pipelined fashion to provide improved throughput and speed.

Attention is now specifically directed to the structures shown in FIG. 1. System 500 is seen to comprise an array of processor groups 300. Controller 400, preferably implemented as a microprocessor stores into and retrieves from system memory 450 pluralities of sequences of request blocks. At the start of a task, or a defined sequence of tasks, controller 400 fetches the request blocks from a portion of memory 450 associated with one of the processor groups 300 or even with one of the individual processing elements 100. In the beginning, assignment of request blocks to identified processor groups 300 or to individual processors 100 is by memory location. As processing proceeds, memory 400 is dynamically partitioned by controller 400 into regions of variously sized regions corresponding to tasks of various sizes and priorities. Controller 400 provides the request blocks (sequences of instructions particularly formatted and with appropriate content for carrying out cryptographic operations) to clear link interface 290 in each processor group 300.

While the present invention is illustrated in its larger embodiment in FIG. 1, it is noted that the principles employed herein are just as easily applied if there were but a single group of processors. One of the basic principles upon which the present invention rests is the pipeline capabilities of cryptographic engine(s) 195. This aspect is fully described in the U.S. patent cited above. The present invention expands on the previous patent by taking advantage of two aspects of the cited works. The first aspect is the aforementioned pipelining capabilities present in the cryptographic engines. The second aspect is the ability to provide secure interactions between processor elements via an external memory as provided in application Ser. No. 11/331,918 filed on Jan. 13, 2006.

FIG. 2 provides a better view into the structure of each group 300 shown in FIG. 1. In particular, it is seen that each group 300 includes a plurality of processors 100 which share external memory 200 which processors 100 treat as having encrypted segments 210 and unencrypted segments 220 which processors 100 use to maintain security while at the same time maintaining coordinated processing capabilities.

FIG. 3 provides a more detailed view showing the connections amongst processors 100A through 100D. The links that are not shown as having clear data (that is, unencrypted data) are assumed to carry encrypted data back and forth between a processor 100 and encrypted memory portion 210. External connection for the group is provided by interface 290, preferably implemented via a FPGA. While FIG. 3 shows the interconnections for four processors (100A through 100D), the concepts shown therein are extendible to any convenient number of processors. In FIG. 3, four processors are shown for illustrative convenience. However, FIGS. 1 and 2 illustrate the situation in which eight processors are employed.

The architecture of the processing element from issued U.S. Pat. No. 7,080,110 is shown in detail in FIG. 4. The device shown is a secure single chip for carrying out cryptographic functions. It is noted that the mechanisms and procedures set forth therein are also more widely applicable to any situation in which one wishes to employ FPGA circuits in a fashion in which they can only be programmed in a secure manner by trusted entities having possession of appropriate cryptographic keys. Furthermore, as seen in FIG. 4, chip 100 includes embedded (micro)processor 115. This enables the construction of generic microprocessor chips where the processor is controlled in a secure manner by an FPGA which is itself programmable in an entirely secure manner which is more particularly in the issued patent cited. This means that any embedded processor can be controlled in a secure fashion. For example, it can be controlled so as to limit the execution of certain instructions to trusted users who can provide authenticatable keys.

In preferred embodiments of the present invention, security is also provided within secure boundary 101 which is tamper evident, tamper resistant and tamper responding and which preferably meets Level 4 FIPS standards. In this regard, it is noted that tamper proof enclosures do not require that a mesh be present; tamper proof enclosures can be constructed without meshes, as defined in the FIPS 140-2 standard. Since the present invention relates to cryptographic processing systems and, even more particularly to systems of this nature implemented with integrated circuit chips, it is useful to point out the existence of the Federal Information Processing Standards (FIPS) publication titled "Security Requirements for Cryptographic Modules" (FIPS PUB 140-2 issued May 25, 2001 which supersedes FIPS PUB 140-1 dated Jan. 11, 1994). This publication discusses four levels of security from the lowest level of security (Security Level 1) to the highest level of security (Security Level 4). The processors preferably employed in the present invention are capable of implementing the highest level of security described in the FIPS publication. An example of a Security Level 1 cryptographic module is described therein as being represented by a Personal Computer (PC) encryption board. Security Level 2 goes further in that it requires that any evidence of an attempt at physical tampering be present. Security Level 3 goes even further in that it attempts to thwart any attempts at tampering. This level of security also requires identity-based authentication mechanisms. Security Level 3 also requires that the input or output of plaintext "critical security parameters" (that is, "CSPs" such as unencrypted key information, which for single pass encryption processes may be human readable) to be performed through ports that are physically separated from other ports or interfaces. In Security Level 4 a complete envelope of protection around the cryptographic module is provided with the intent of detecting and responding to all unauthorized attempts at physical access with the penetration of the module enclosure resulting in the immediate zeroing of all plaintext critical security parameters.

To be more specific, single-chip, secure cryptographic processor 100 comprises several principal portions: external interface 110, processor 115, cryptographic engine (or engines) 195, random number generators (125 and 126), external memory interface 105 and memory components disposed within powered voltage island 145. The rest of the chip is powered separately and exists on its own voltage island. However, switching between regular power and battery power is carried out within the chip itself using a voltage regulator with the default power source being regular power and with the alternate source as a backup being a battery. There is no pin saving to be had by moving this function off of the chip. The only saving would be in the consumption of less chip circuit area but that advantage would not help to solve the latency problem for external devices. All of these components are preferably provided on a single chip (hence the acronym COACH). In addition, there is provided flow control switch 150 which receives external requests through interface 110 in the form of request blocks. While component 150 is described as a switch it also includes a request block processor which receives requests blocks and, in response thereto, directs and controls the flow of information between and among the various other processor components. b Most importantly for the present invention switch 150 preferably comprises two distinct components ASIC portion (Application Specific Integrated Circuit) 150A and FPGA portion 150B (see FIG. 5). ASIC portion 150A is also characterizable as a "hard wired" circuit. ASIC portion 150A is used to initialize the system, to initially process request blocks, to interface with the FPGA portion and to insure that only secure FPGA information is used to configure FPGA portion 150B of switch 150. It is the presence of securely configurable FPGA portion 150B that gives rise to a chip that has both highly secure and highly flexible characteristics whether the chip is used to provide access to cryptographic engines or for other purposes related to secure processor control. It is also noted that FPGA portion 150B makes it possible for a chip vendor to provide a completely customized processor unit. With specific reference to FIG. 5 it is noted that connections from flow control circuit 150 to other components on the chip are not limited to connections that are only made to ASIC side 150A. For example, FIG. 5 should not be interpreted as indicating that there are no connections between FPGA portion 150A and cryptographic engines 195. However, it is noted that even if the chip is intended for processor control and not intended to be limited to cryptographic operations, some form of internal cryptographic engine is desired to provide encryption and decryption that makes the processing secure.

While block 150 functions primarily as a hub for receiving data and commands and for routing relevant information to the other components on the chip, it includes a command processor mechanism for interpreting commands and for initiating steps to assure command completion together with notification of completion and/or completion status. In particular, switch 150 includes request processor 155 which interprets command portions of request block buffer 151. Buffer 151 should not be considered to be limited to the role of buffering only small numbers of characters or bits. It is preferably sized to hold relatively large portions of data destined for SRAM 132 or for eDRAM 130. Request processor 155 is coupled to one or more cryptographic engines 195 for those circumstances in which encryption and/or decryption is desired.

However, before this is done it is understood that FPGA Configuration Data 160 (see FIG. 5) is programmed first through the invocation of a special purpose and limited "Load FPGA" command processed by processor 155. Additionally, it is noted that, based on the enablement of external memory path 105 the FPGA may also be programmed to accept similar request blocks through interface 110.

While the discussion above refers to devices 300 as being an array of cryptographic processor chips operating in a secure, coordinated fashion, it is noted that with advances in technology, these devices may all be incorporated on a single chip or within some other monolithic structure carrying out the same logical functions and operations. This is likewise true of the entire system shown in FIG. 1.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for controlling cryptographic operations in a cryptographic processing system, the method comprising:
   providing a plurality of instruction streams from a system memory;
   supplying, via a controller, the plurality of instruction streams to a plurality of cryptographic processors of the cryptographic processing system, the supplying of the plurality of instruction streams to-the plurality of cryptographic processors initially based on addresses of the instructions within the system memory;
   subsequent to beginning the supplying, dynamically partitioning by the controller at least a portion of the system memory into different dynamically partitioned regions to facilitate pipeline processing of cryptographic operations by the plurality of cryptographic processors based on the dynamically partitioned regions, the dynamically partitioned regions being various-sized regions of system memory, and being sized at least in part according to one or more attributes of the cryptographic operations being processed; and supplying, via the controller, subsequent instruction streams to the plurality of cryptographic processors of the cryptographic processing system based on the dynamically partitioned regions in the system memory assigned.

2. The method of claim 1, wherein the supplying, via the controller, the plurality of instruction streams comprises supplying a balanced set of instruction streams from the system memory to the plurality of cryptographic processors, wherein the plurality of cryptographic processors are operating securely and in a coordinated fashion.

3. The method of claim 1, wherein the plurality of cryptographic processors comprise an array of groups of cryptographic processors, with the processors in each group operating securely and in a coordinated fashion.

4. The method of claim 3, in which at least one of said plurality of cryptographic processors includes a cryptographic engine capable of processing requests in a pipelined fashion.

5. The method of claim 3, in which each cryptographic processor of said plurality of cryptographic processors is a separate cryptographic processor chip comprising a cryptographic engine, a microprocessor for controlling said engine, an interface for supplying instructions to said cryptographic processor chip and a switch for controlling the flow of information amongst said engine, said microprocessor and said interface.

6. The method of claim 1, wherein the dynamically partitioning comprises dynamically partitioning by the controller the at least a portion of system memory into different dynamically partitioned regions of various sizes at least in part according to priority attributes of the cryptographic operations being processed by the plurality of cryptographic processors.

7. The method of claim 1, wherein the dynamically partitioning comprises dynamically partitioning by the controller the at least a portion of system memory into different dynamically partitioned regions of various sizes at least in part according to size attributes of the cryptographic operations being processed by the plurality of cryptographic processors.

8. A cryptographic processing system for carrying out cryptographic operations, said system comprising:

a system memory; and a plurality of cryptographic processors in communications with the system memory via a controller, wherein the cryptographic processing system is configured to perform a method, the method comprising:

providing a plurality of instruction streams from the system memory;

supplying, via the controller, the plurality of instruction streams to the plurality of cryptographic processors of the cryptographic processing system, the supplying of the plurality of instruction streams to the plurality of cryptographic processors initially based on addresses of the instructions within the system memory;

subsequent to beginning the supplying, dynamically partitioning by the controller at least a portion of the system memory into different dynamically partitioned regions to facilitate pipelined processing of cryptographic operations by the plurality of cryptographic processors based on the dynamically partitioned regions, the dynamically partitioned regions being various-sized regions of system memory, and being sized at least in part according to one or more attributes of the cryptographic operations being processed; and supplying, via the controller, subsequent instruction streams to the plurality of cryptographic processors of the cryptographic processing system based on the dynamically partitioned regions in system memory assigned.

9. The system of claim 8, wherein the dynamically partitioning comprises dynamically partitioning by the controller the at least a portion of system memory into different dynamically partitioned regions of various sizes at least in part according to priority attributes of the cryptographic operations being processed by the plurality of cryptographic processors.

10. The system of claim 8, wherein the dynamically partitioning comprises dynamically partitioning by the controller the at least a portion of system memory into different dynamically partitioned regions of various sizes at least in part according to size attributes of the cryptographic operations being processed by the plurality of cryptographic processors.

11. The system of claim 8 in which all of said cryptographic processors include a cryptographic engine capable of processing requests in a pipelined fashion.

* * * * *